(12) United States Patent
Agrawal et al.

(10) Patent No.: US 11,374,964 B1
(45) Date of Patent: *Jun. 28, 2022

(54) PREVENTING LATERAL PROPAGATION OF RANSOMWARE USING A SECURITY APPLIANCE THAT DYNAMICALLY INSERTS A DHCP SERVER/RELAY AND A DEFAULT GATEWAY WITH POINT-TO-POINT LINKS BETWEEN ENDPOINTS

(71) Applicant: Airgap Networks Inc., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignee: AIRGAP NETWORKS INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/587,604

(22) Filed: Jan. 28, 2022

Related U.S. Application Data

(63) Continuation-in-part of application No. 17/497,756, filed on Oct. 8, 2021, now Pat. No. 11,303,673, which is a continuation-in-part of application No. 17/357,757, filed on Jun. 24, 2021, now Pat. No. 11,171,985.

(51) Int. Cl.
*H04L 29/06* (2006.01)
*H04L 9/40* (2022.01)

(52) U.S. Cl.
CPC ........... *H04L 63/145* (2013.01); *H04L 63/02* (2013.01); *H04L 63/1416* (2013.01); *H04L 63/20* (2013.01)

(58) Field of Classification Search
CPC ............ H04L 63/1466; H04L 12/4641; H04L 63/1416
See application file for complete search history.

(56) References Cited

U.S. PATENT DOCUMENTS

| | | | | |
|---|---|---|---|---|
| 6,914,905 | B1 * | 7/2005 | Yip | H04L 12/4641 370/395.53 |
| 8,055,800 | B1 | 11/2011 | Bardzil et al. | |
| 9,306,965 | B1 | 4/2016 | Grossman et al. | |
| 9,602,529 | B2 * | 3/2017 | Jones | G06F 21/577 |
| 10,454,950 | B1 | 10/2019 | Aziz | |

(Continued)

OTHER PUBLICATIONS

Thapa, Manish, "Mitigating Threats in IoT Network Using Device Isolation", Master's Thesis, Feb. 4, 2018, 73 pgs.

(Continued)

*Primary Examiner* — Arvin Eskandarnia
(74) *Attorney, Agent, or Firm* — Patent Law Works LLP

(57) ABSTRACT

A technique to stop lateral movement of ransomware between endpoints in a VLAN is disclosed. A security appliance is set as the default gateway for intra-LAN communication by overwriting the DHCP responses. Message traffic from compromised endpoints is detected. Attributes of ransomware may be detected in the message traffic, as well as attempts to circumvent the security appliance. Compromised devices may be quarantined. The security appliance may act in response to an initial detection of ransomware such that it does not ordinarily interfere with operation of a primary DHCP server.

24 Claims, 14 Drawing Sheets

(56) References Cited

U.S. PATENT DOCUMENTS

| | | |
|---|---|---|
| 11,030,311 B1 | 6/2021 | Lopez |
| 11,093,139 B1* | 8/2021 | Karr ...................... G06F 3/0652 |
| 2016/0323318 A1 | 11/2016 | Terrill et al. |
| 2017/0149775 A1 | 5/2017 | Bachar et al. |
| 2019/0312836 A1 | 10/2019 | Phillips |
| 2020/0145416 A1 | 5/2020 | Mitzimberg |
| 2020/0356664 A1 | 11/2020 | Maor |
| 2021/0152595 A1* | 5/2021 | Hansen ................ H04L 9/0894 |

OTHER PUBLICATIONS

International Search Report and Written Opinion for PCT/US2020/020593, dated Apr. 15, 2020, 8 pgs.
International Preliminary Report on Patentability for PCT/US2020/020593, Completed May 18, 2021, 8 pgs.

* cited by examiner

PREVENTING LATERAL PROPAGATION OF RANSOMWARE USING A SECURITY APPLIANCE THAT DYNAMICALLY INSERTS A DHCP SERVER/RELAY AND A DEFAULT GATEWAY WITH POINT-TO-POINT LINKS BETWEEN ENDPOINTS

CROSS REFERENCE TO RELATED APPLICATIONS

This application is a continuation-in-part of U.S. patent application Ser. No. 17/497,756, filed Oct. 8, 2021, entitled "System and Method for Preventing Lateral Propagation of Ransomware Using a Security Appliance that Functions as a DHCP Relay on a Shared Network", which is a continuation-in-part of U.S. patent application Ser. No. 17/357,757, filed Jun. 24, 2021, entitled "System and Method to Detect Lateral Movement of Ransomware by Deploying a Security Appliance Over a Shared Network to Implement a Default Gateway with Point-To-Point Links Between Endpoints", which are hereby incorporated by reference in their entirety.

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A technique to detect lateral propagation of ransomware between endpoints in a VLAN is disclosed. In one implementation, a smart appliance is set as the default gateway for intra-LAN communication for two or more endpoint devices. Message traffic from compromised endpoints is detected. Additional measures may also be taken to generate alerts or quarantine compromised end point devices.

In one implementation, the security appliance is dynamically inserted as the Dynamic Host Configuration Protocol (DHCP) server and becomes the default gateway after ransomware is detected. A subnet mask of 255.255.255.255 is used to set the security appliance as a default gateway for a plurality of endpoint devices of the shared VLAN environment. The security appliance monitors intra-VLAN communication between the plurality of endpoint devices of the shared VLAN environment. The security appliance detects lateral propagation of ransomware between endpoint devices via intra-VLAN communication in the shared VLAN environment.

It should be understood, however, that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
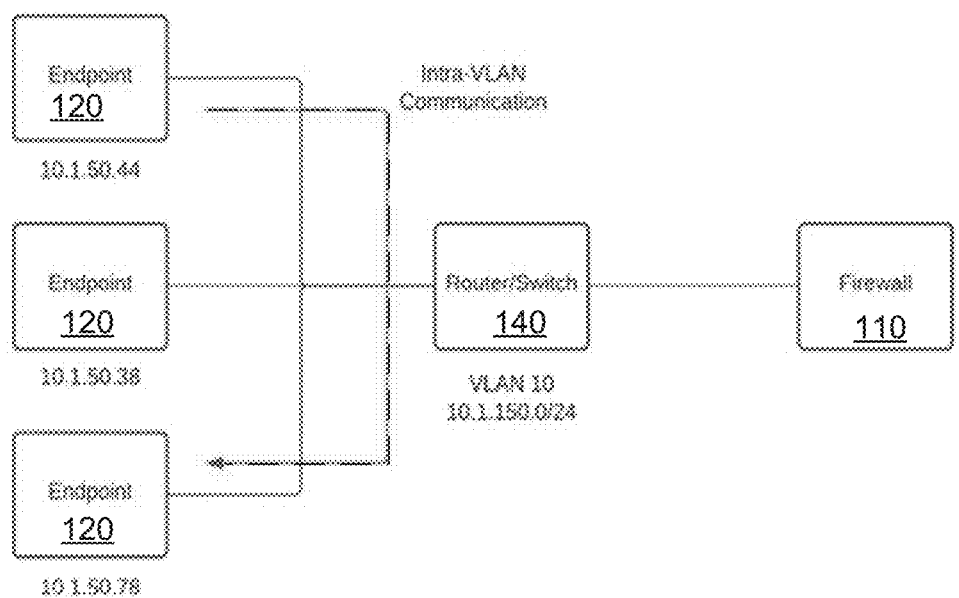
FIG. 1 is a block diagram illustrating Intra-LAN traffic in a conventional VLAN network.
Figure 2:
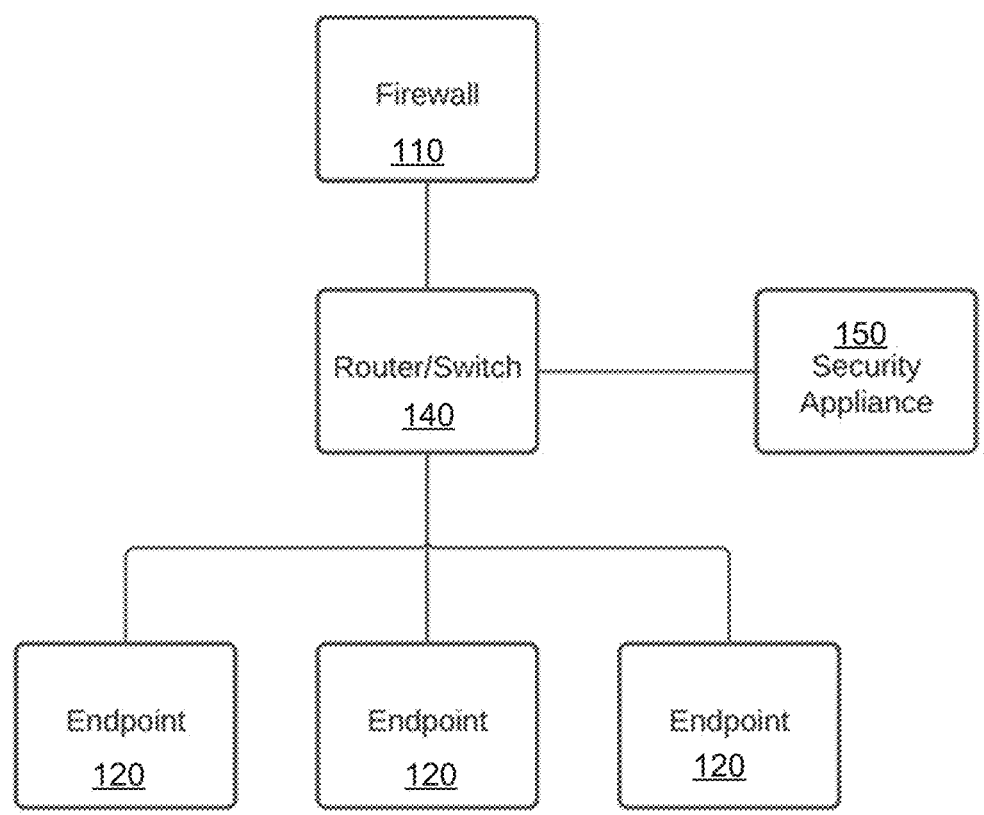
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all-ones—255.255.255.255.

When an individual endpoint 120 requests an IP address, the security appliance 150 sets the security appliance as the default gateway for the endpoint. In one implementation, the security appliance responds with a subnet comprised of all-ones—255.255.255.255—and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
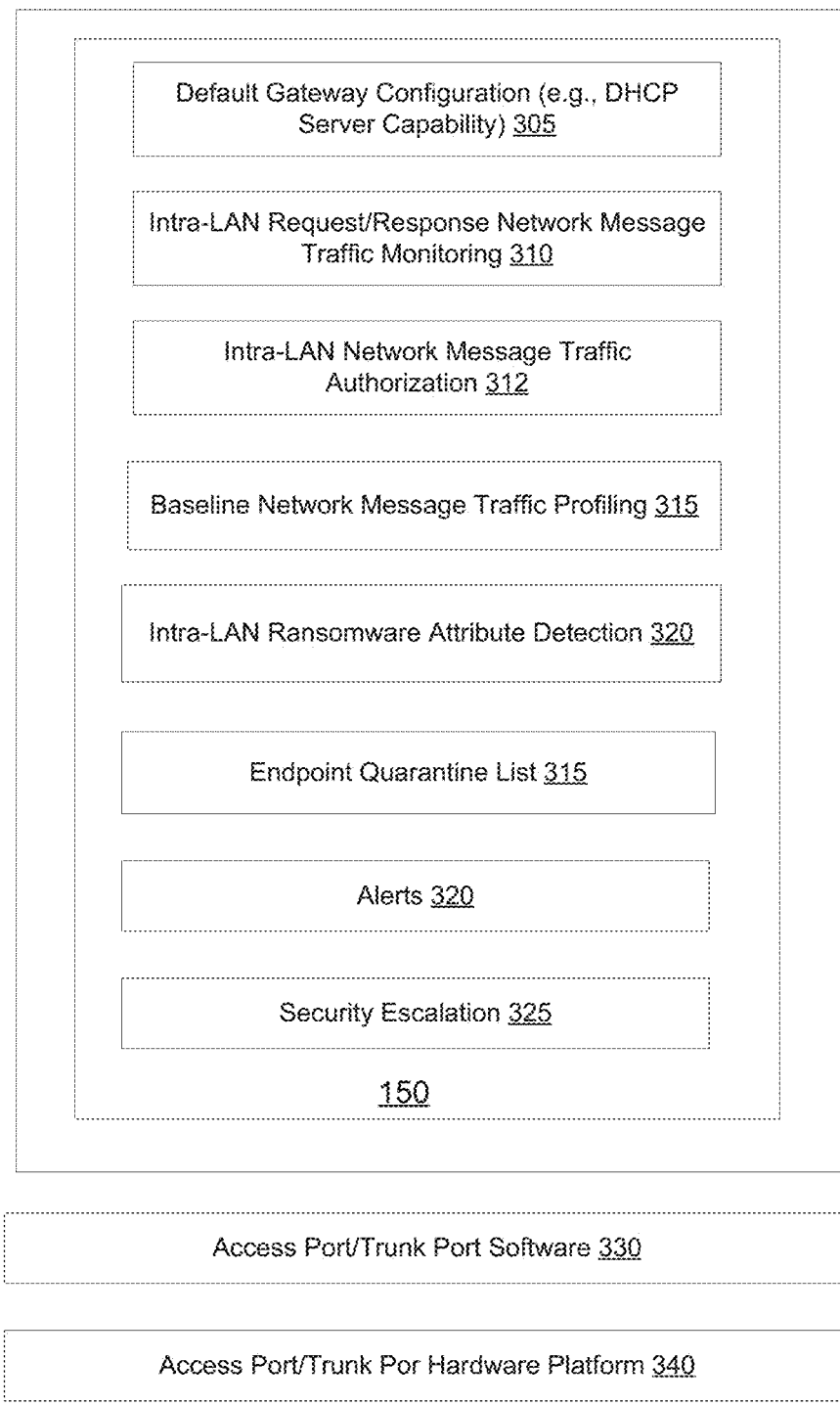
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 315 to quarantine compromised endpoints. This may include, for example, generating a list of quarantined endpoint devices that are used to block intra-LAN communication for compromised devices (i.e., to stop the lateral movement of ransomware). An alert unit 320 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
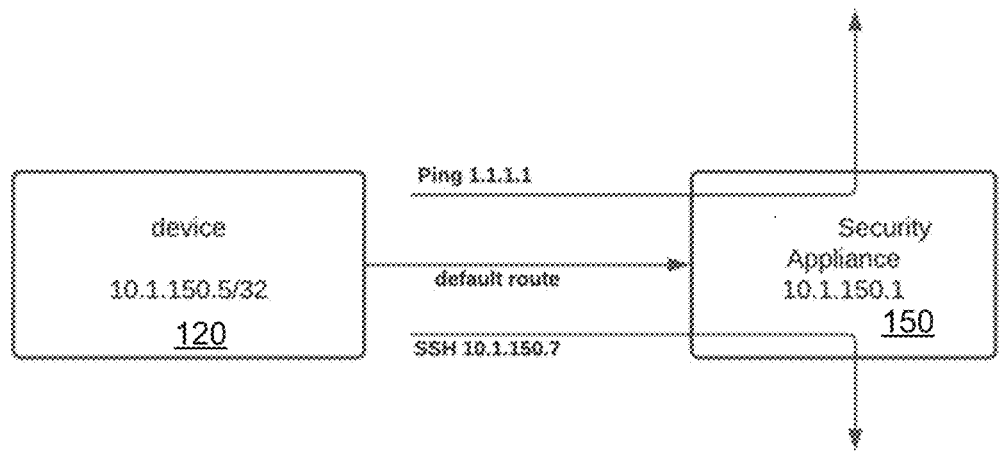
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
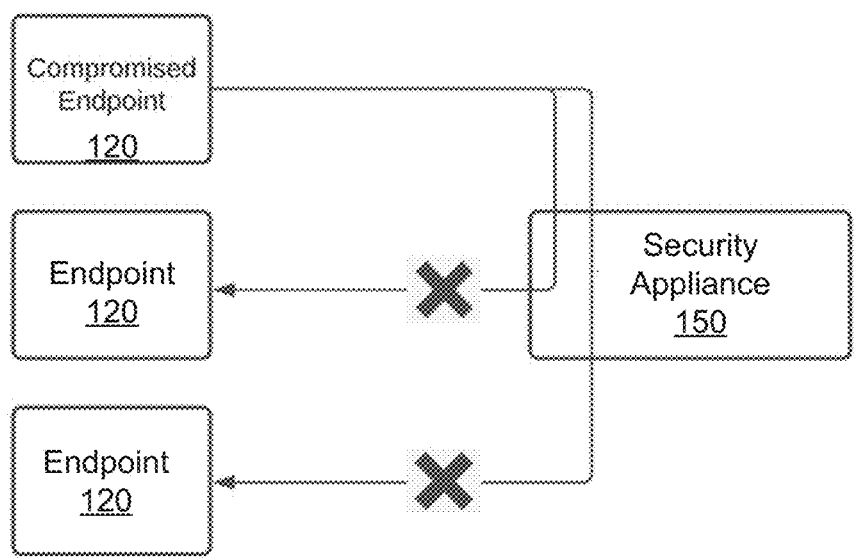
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
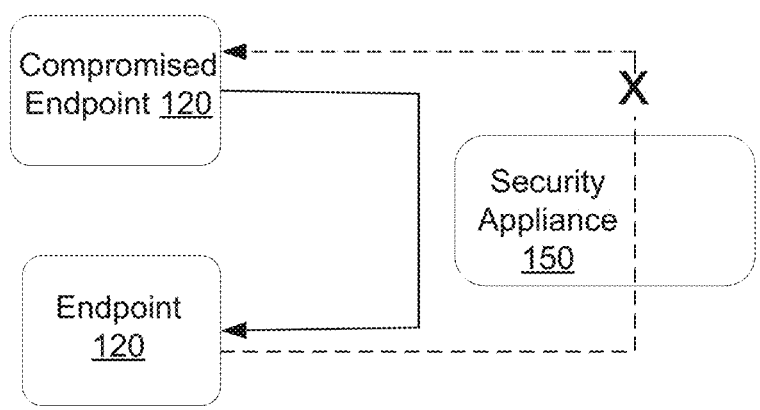
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
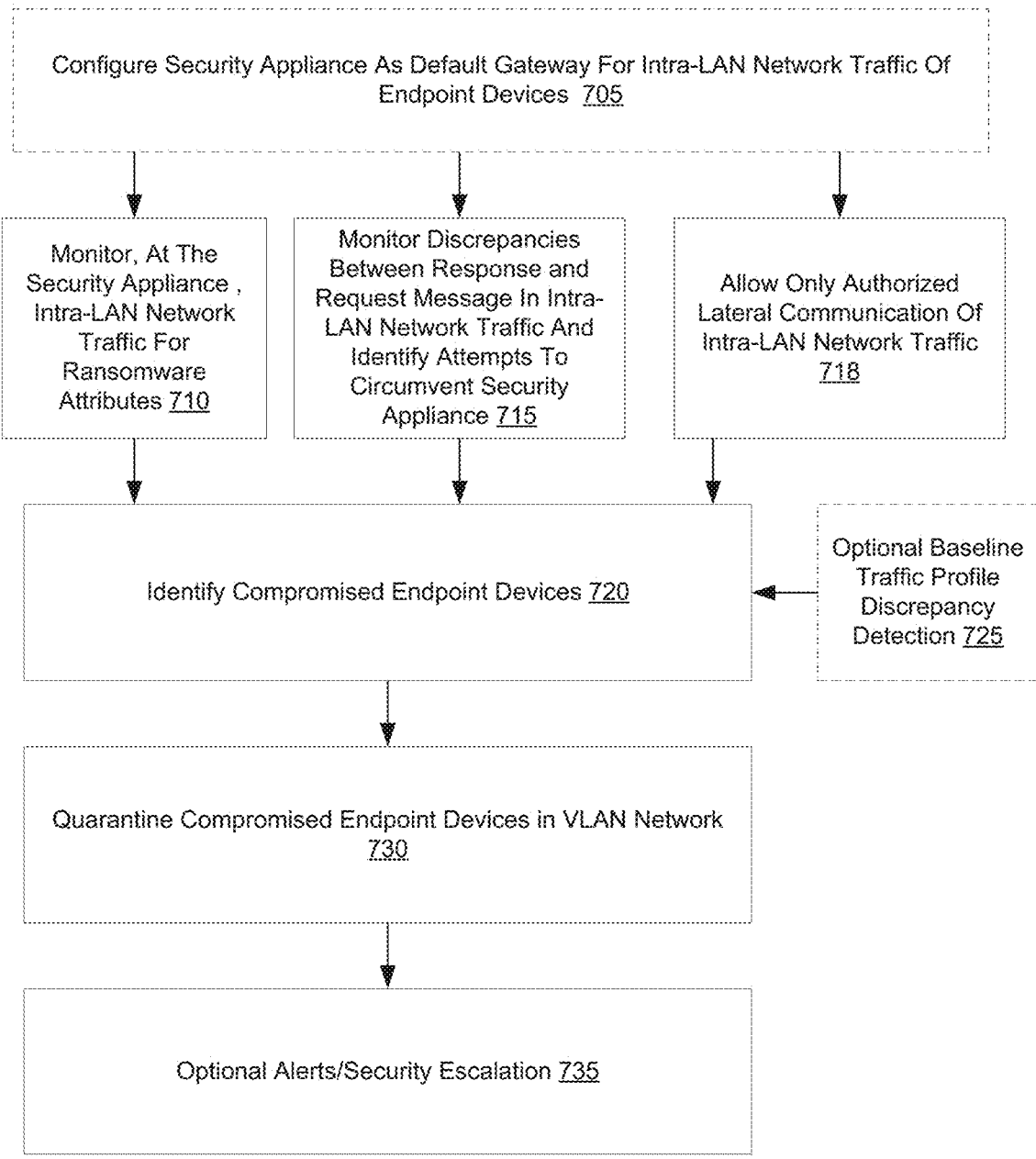
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

DHCP Relay Based Implementations

As previously discussed, a security appliance may be used to protect device endpoints on a shared VLAN network from lateral propagation of malware and ransomware. However, in some implementations the security appliance 150 may be implemented in different ways. In some end-use scenarios, it may be desirable to implement the security appliance to operate in combination with a conventional original DHCP server. For example, in a deployment of the security appliance to upgrade an existing VLAN network, customers may want to ensure that their original DHCP server continues to operate without any changes to it. Also, in some implementations ensuring a graceful failure mode is a key concern. For example, some customers may want assurance that there is a graceful failure mode in the unlikely event that the security appliance 150 temporarily goes down.

Figure 8:
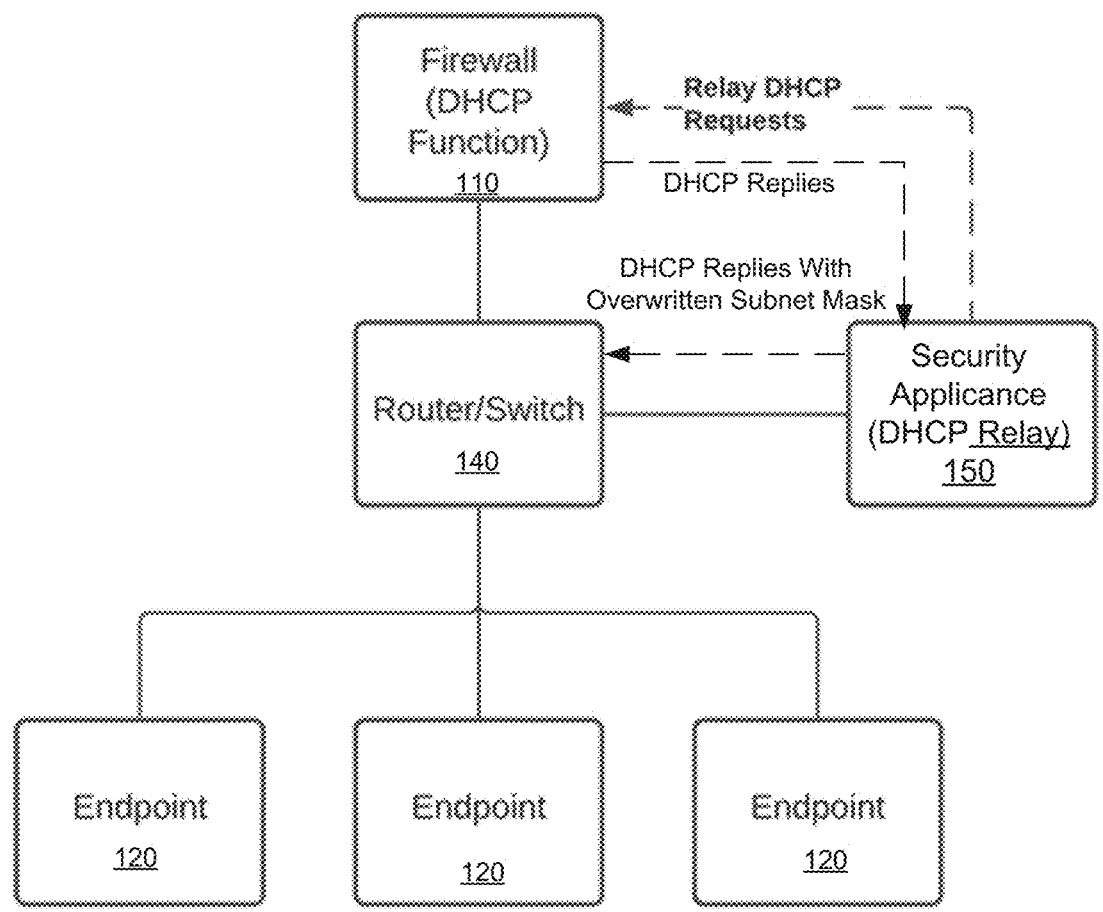
FIG. 8 illustrates an implementation of the security appliance having a DHCP relay function in accordance with an implementation.

FIG. 8 illustrates a deployment architecture in which the security appliance 150 is deployed on a trunk port on the existing router or switch. In this implementation, the security appliance 150 has a DHCP relay function and acts as a DHCP relay for the existing VLAN network. As indicated by the dashed lines, when an endpoint device 120 requests an IP address via a DHCP request, the security appliance 150 acts as a DHCP that relays the DHCP request to the original DHCP server on the network (shown as part of the Firewall function 110). When the response is received from the original DHCP server, the security appliance 150 overwrites the subnet mask in the response with a subnet mask which is comprised of all ones: 255.255.255.255. This results in the security appliance 150 configuring itself as the default gateway for the endpoint by overwriting the router/gateway property in the response. This process continues for all of the endpoints 120 in a VLAN domain. A provisioning or setup process may be optionally used to ensure that all of the endpoint devices request an IP address and use the security appliance as the default gateway.

Figure 9:
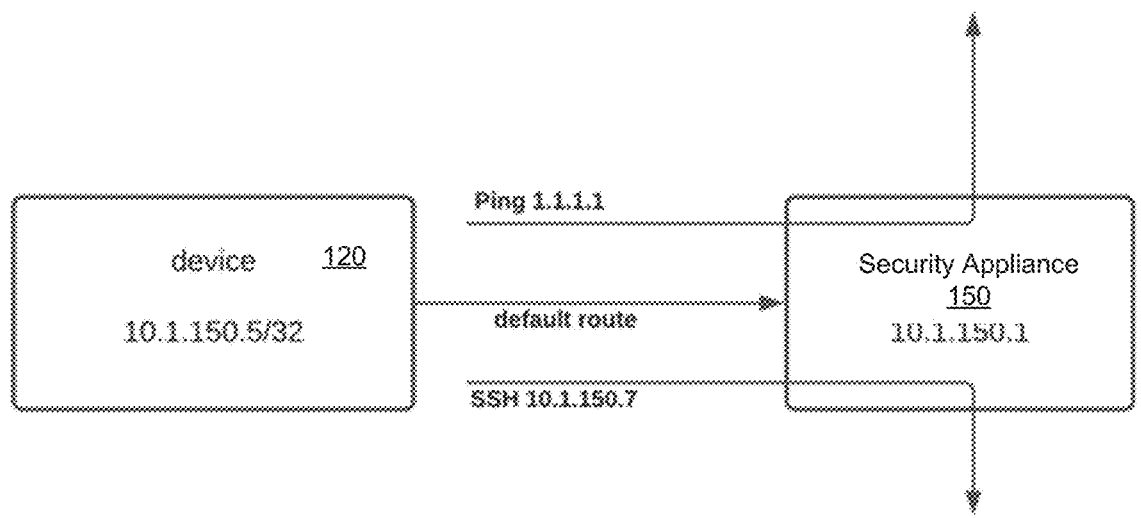
FIG. 9 illustrates a default gateway function in accordance with an implementation.

Since each individual endpoint device receives an IP address with a subnet mask of 255.255.255.255, any network communication with other endpoint devices or internet applications needs to be routed via the default gateway. From the perspective of an individual endpoint, other endpoints, and applications appear to be in a different IP network. Hence all outbound packets are sent to the default gateway as shown in FIG. 9.

Figure 10:
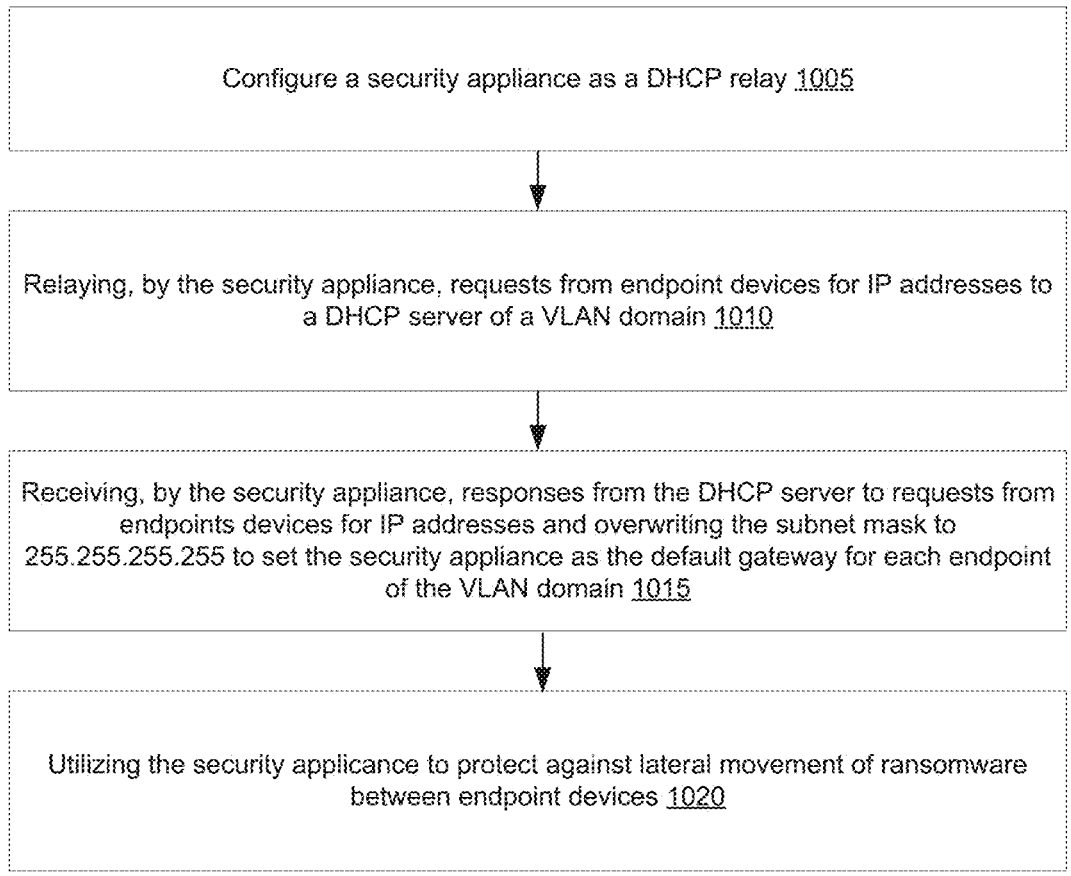
FIG. 10 illustrates a high level flow chart of a method of using a security appliance with a DHCP relay function to protect against ransomware in accordance with an implementation.

FIG. 10 is a flowchart of a method in accordance with an implementation. In block 1005 a security appliance is configured as a DHCP relay. For example the security appliance may include a DHCP relay function that is activated when the security appliance is deployed in a VLAN network having a firewall with a DHCP server. In block 1010, in operation the security appliance relays DHCP IP address requests from individual endpoint devices of a VLAN domain to the DHCP server. In block 1015, the security appliance receives DHCP response and overwrites the subnet mask with all ones to 255.255.255.255. This sets the security appliance as the default gateway. In block 1020, the security appliance is used to protect against lateral movement of ransomware between endpoint devices.

Figure 11:
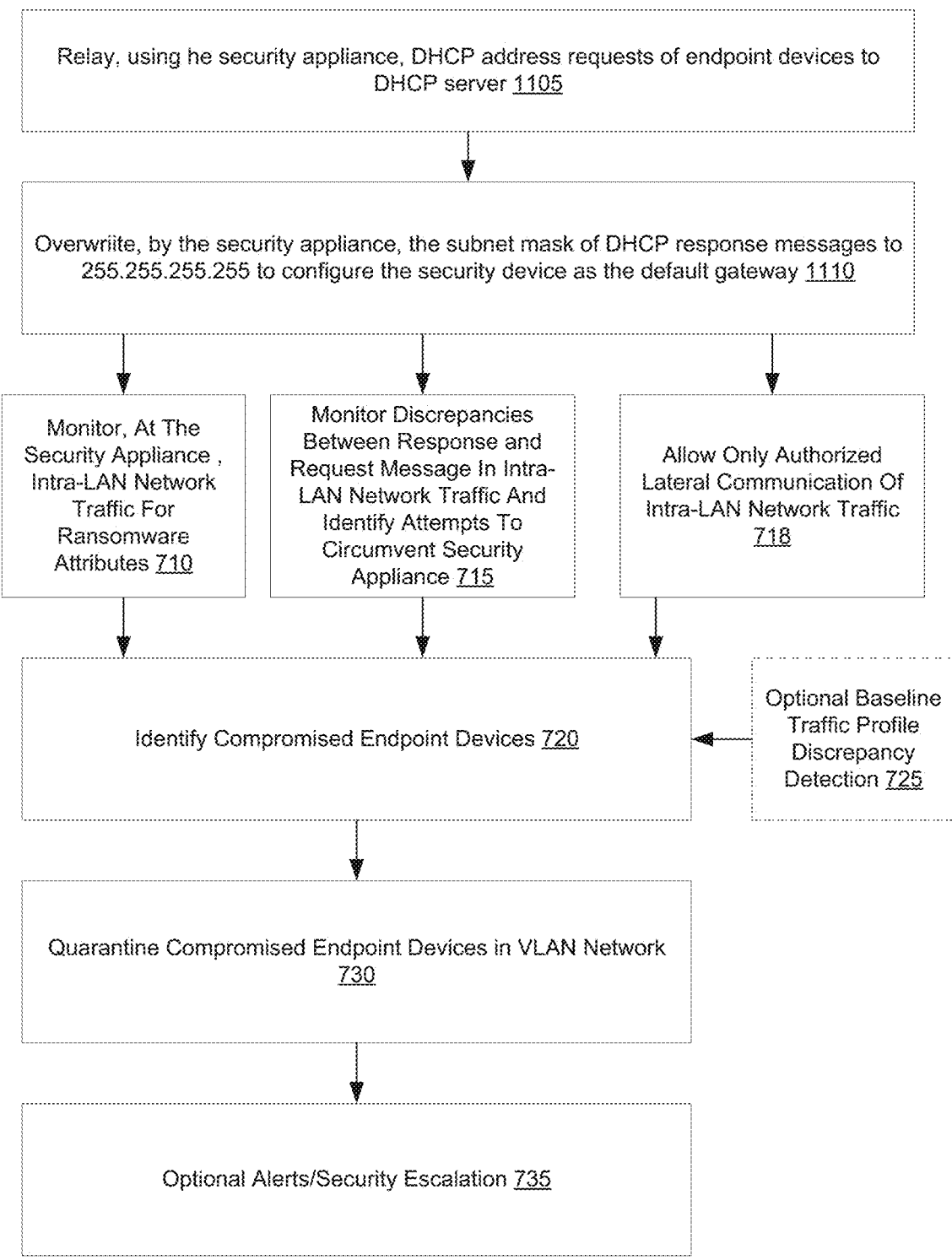
FIG. 11 is a flow chart illustrating how a security appliance with a DHCP relay function can provide a variety of layer of protection similar to that of FIG. 7 in accordance with an implementation.

As illustrated in FIG. 11, the security appliance may be used to implement features described in regards to FIG. 7. The security appliance becomes the default gateway in blocks 1105 and 1110 by virtue in the process of the security appliance relaying DHCP IP address request to the DHCP server (block 1105) and overwriting the subnet mask (block 1110) to set the security appliance as the default gateway.

The particular implementation of the security appliances in FIG. 8 to FIG. 11 increases the overall reliability of the deployment. In the unlikely scenario that the security appliance were to fail, an automated script could reconfigure the network switch so that the original DHCP server assumes the DHCP function in the network. This would ensure seamless downgrade with no downtime.

While failure of the security appliance is an unlikely scenario, ultra-high reliability and graceful failure is important in some end use applications.

Dynamic Insertion of Inline Security Appliance Protection Functionality

As previously discussed, the security appliance 150 may be deployed in-line and establish virtual point to point links with each endpoint. However, the security appliance 150 then becomes a single point of failure in the network communication path between endpoints during normal operation, even when no malicious threat is detected.

The security appliance 150 may be designed to be extremely reliable. But some customers may have previously invested in a high-reliability DHCP service and be reluctant to replace an existing DHCP service. From an IT manager's perspective, there are tradeoffs in various risks and benefits, depending on assumptions an IT manager makes about different risks/benefits, such as the risks/benefits of protection from lateral spread of ransomware in a particular VLAN network versus the risks/benefits for switching DHCP services.

Some customers may be more adverse to switching DHCP services than others. For example, a customer who believes that their downside risk for ransomware for a particular VLAN network is below average is different than a customer who believes that their downside risk for ransomware for a particular VLAN network is average or above average. Similarly, an individual customer who had previous failure with a prior DHCP service may have more concerns about DHCP service reliability than a customer who didn't.

The result is that some customers may perceive risks and benefits differently than other customers. Some customers may want technical options that favor maintaining a proven DHCP service but with slightly less effective protection against lateral propagation of ransomware. To address that segment of customers, in an implementation of a deployment architecture, the security appliance 150 is dynamically inserted inline to serve as the default gateway after a malicious threat is identified. This solution achieves a compromise of different objectives. It provides significant protection against lateral propagation of ransomware (but not as good as if the VLAN network is continuously operated with the security appliance 150 as the default gateway). However, this solution effectively eliminates the risk of the security appliance 150 being a single point of failure in the network communication path between endpoints during normal operation, even when no malicious threat is detected.

Figure 12:
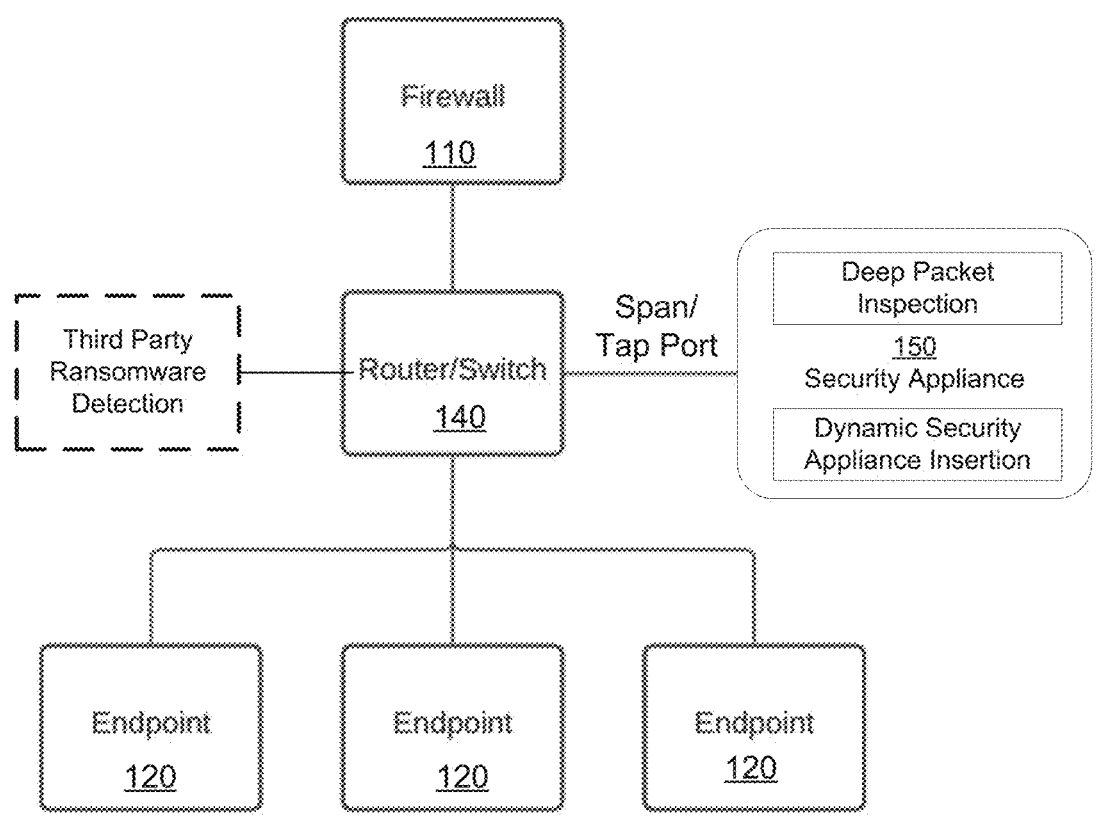
FIG. 12 is a block diagram illustrating a dynamically inserted security appliance to provide protection from lateral movement of ransomware in accordance with an implementation.

Referring to FIG. 12, in one implementation the security appliance 150 is modified to support dynamic security appliance insertion. The security appliance 150 may, for example, monitor copies of network packets from a span or tap port using deep packet inspection. That is, the security appliance 150 may monitor network traffic, inspect packets, detect signs of ransomware. The security appliance 150 may then in response to detecting ransomware instruct a primary DHCP server (e.g., in the router/switch 140) to quiesce itself. The security appliance then activates its DHCP server functionality and operates as the DHCP server for the VLAN network. When an endpoint device renews its DHCP lease, the security appliance 150, which is now acting as the DHCP server on the VLAN network, will respond with a subnet mask which is comprised of all ones—255.255.255.255. The security appliance 150 sets itself as the default gateway for the compromised endpoint and provides protection against lateral propagation of ransomware as in previously described examples.

A typical DHCP lease interval used by many companies is 24 hours. Thus, there would typically be a time delay from when ransomware is detected until when the security appliance 150 becomes the default gateway. However, an individual company could select a shorter DHCP lease interval, if desired, to further mitigate risk. This choice is related to tradeoffs in balancing risks and benefits.

Figure 13:
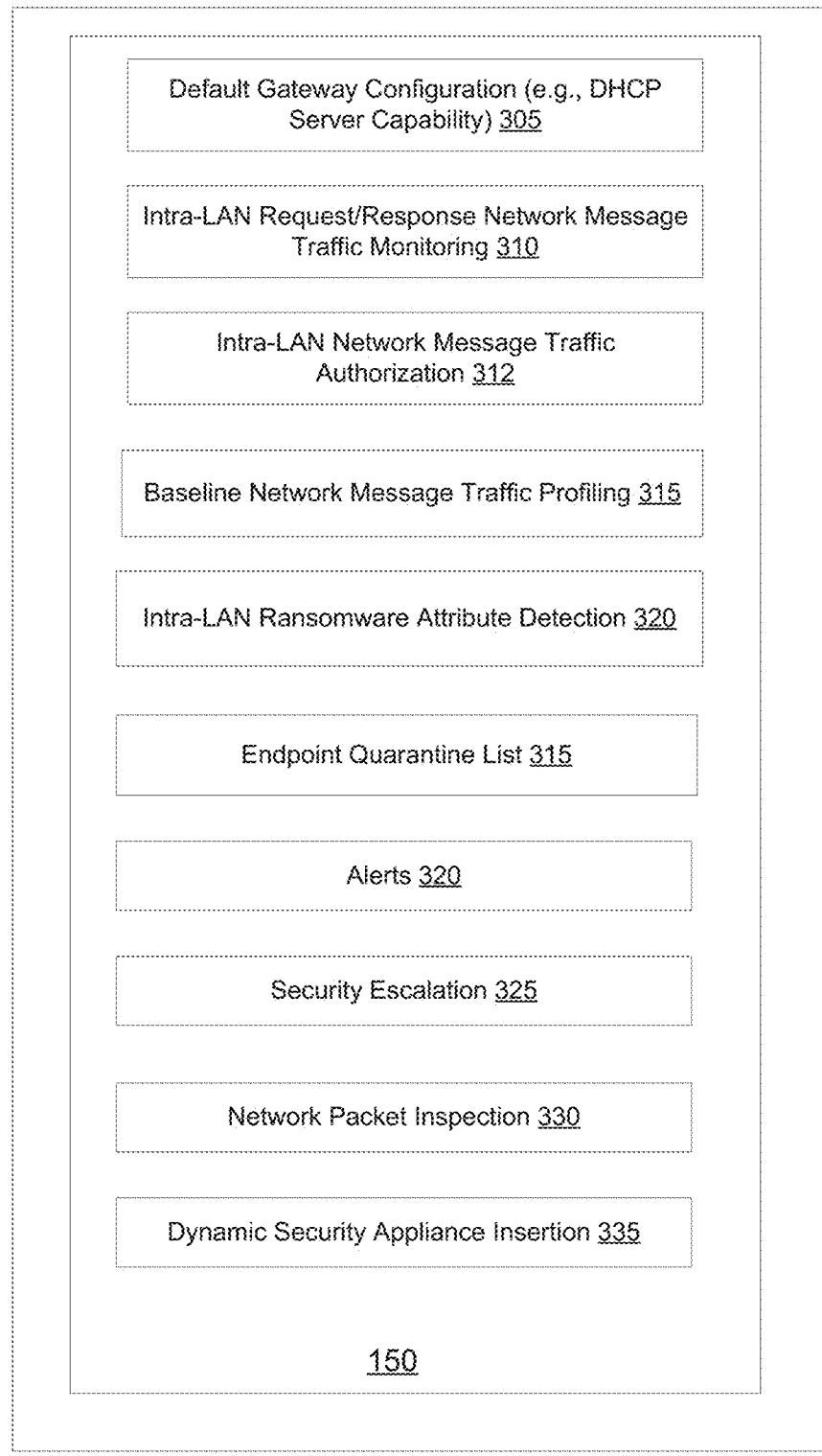
FIG. 13 is a block diagram illustrating components of a dynamically inserted security appliance in accordance with an implementation.

As illustrated in FIG. 13, in the example of FIG. 12, the security appliance may have functional modules similar to that of FIG. 3, with the addition of features such as network packet inspection 330 and dynamic security appliance insertion 335. For example, a dynamic security appliance insertion module 335 may issue API commands to quiesce a primary DHCP server after ransomware is detected. The dynamic security appliance insertion module 335 may also coordinate activating the DHCP functionality of the security appliance after ransomware is detected.

In one implementation, the security appliance 150 is deployed on a TAP or a SPAN port on the network switch. During normal operation of the network, the security appliance 150 receives a copy of network packets exchanged between endpoints on the shared VLAN network. The security appliance 150 inspects these packets to detect the presence of malicious activity between the endpoints. This inspection may rely on deep packet inspection (DPI) techniques. DPI techniques examine the full content of data packets as they traverse a monitored checkpoint. As examples of DPI analysis that the security appliance may perform, the DPI may include signature analysis to detect malicious payloads, behavioral analysis (based on attack patterns observed with common ransomware and malware attacks) and the use of statistical techniques for transport layer security (TLS) encrypted traffic.

Returning back to FIG. 12, while the security appliance 150 may perform deep packet inspection to detect the signs of ransomware, more generally third party services could be used to provide an initial detection of ransomware. Thus, in some implementations, the security appliance 150 does not have to be deployed in a tap or a span port.

During normal operation, the endpoint devices receive IP addresses from the default DHCP service on the network and they communicate with each other normally. The security appliance deployed on a SPAN port receives a copy of every network packet sent between the endpoint devices. Using a combination of deep-packet inspection, and behavioral/statistical analysis techniques, the security appliance 150 continuously monitors the communication between the endpoint devices to detect the presence of ransomware and other malware activity. It does not cause any impact on normal network operation during this stage.

In one implementation, in response to the security appliance detecting the presence of malicious activity from any of the endpoints within the shared network, it assumes the role of the DHCP server on the network. It may instruct the original DHCP server to quiesce itself. This may be achieved using, for example, API integration into the network switch or the DHCP server.

At this point when the compromised endpoint renews its DHCP lease, the security appliance 150 acting as the DHCP server on the network will respond with a subnet mask which is comprised of all ones—255.255.255.255. The security appliance 150 also sets itself as the default gateway for the compromised endpoint.

The endpoint devices will get the new subnet mask (255.255.255.255) on the next DHCP renewal window. Note that, typical DHCP lease renewal windows are 24 hours or 48 hours. However, in one implementation, an IT manager/operator may choose to implement a shorter lease interval (e.g., 2-4 hours) to allow the security appliance 150 to take over quicker when malicious activity is detected. In some implementations, recommendations may be generated to vary the DHCP lease interval based on a threat level. For example, in response to intelligence of a new ransomware threat at a different location, a recommendation could be made to shorten the DHCP lease interval to the lowest practical level for a particular network (e.g., shortened from 24 hours to 8 hours).

Since the compromised endpoint now receives an IP address from the security appliance with a subnet mask of 255.255.255.255), any network communication with other endpoints or to SaaS/internet applications needs to be routed via the default gateway. From the endpoint device's perspective, other endpoint devices, and applications appear to be in different IP networks. Hence all outbound packets are sent to the default gateway. Since the security appliance 150 sets itself as the default gateway for the network, any East-West communication between the compromised endpoint device and other endpoint devices or applications on different networks will be routed via it. This provides the security appliance 150 the ability to allow only authorized communication and disallow everything else. In this way the security appliance can effectively quarantine the compromised endpoint device and prevent lateral propagation of malware.

Figure 14:
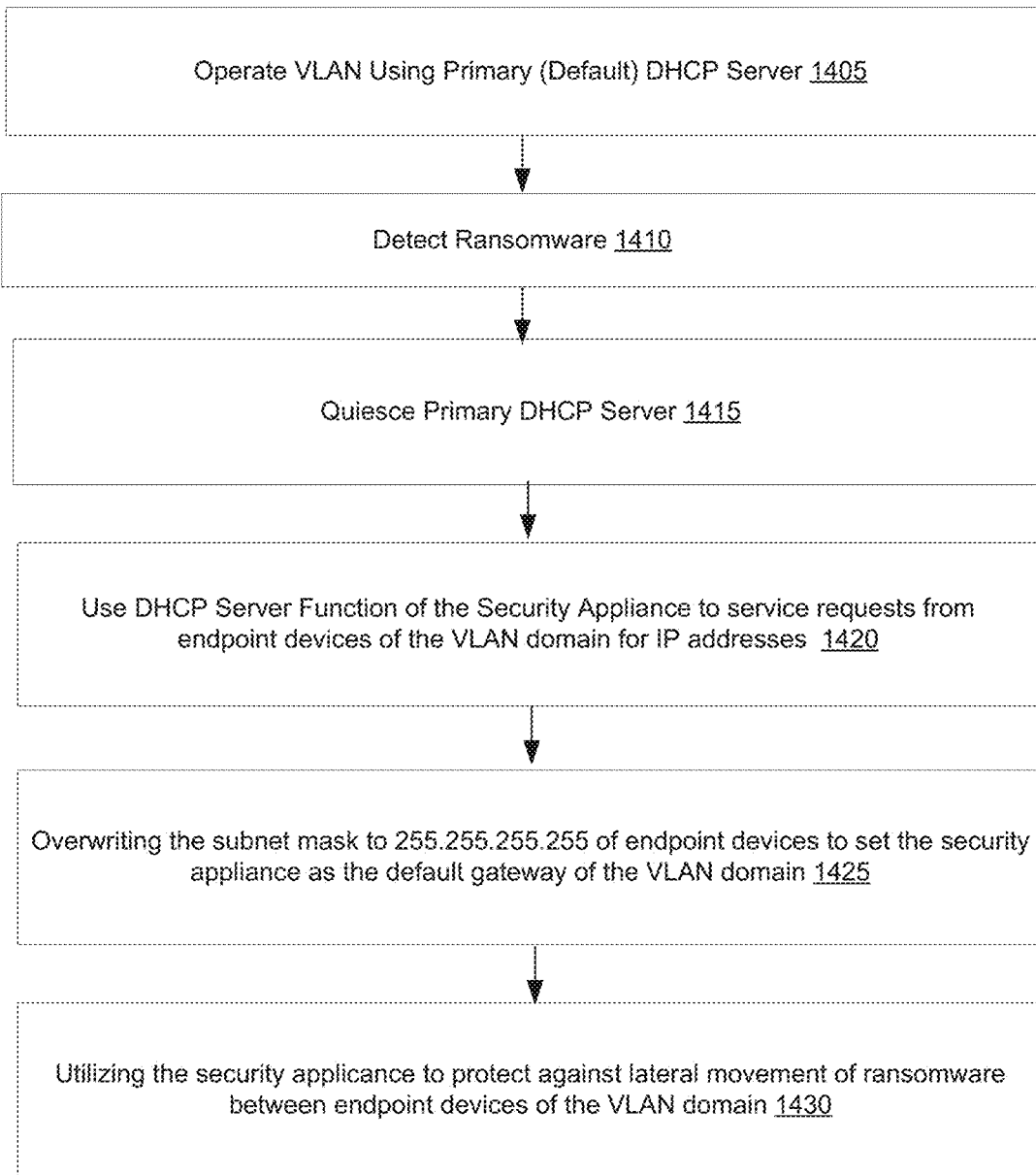
FIG. 14 is a flowchart of a method of dynamically inserting a security appliance to provide later protection from ransomware propagation in accordance with an implementation.

FIG. 14 is a flowchart illustrating an example method in accordance with an implementation. In block 1405, the VLAN network is operating using a primary (default) DHCP server. For example, a particular VLAN network may be operated for many months without facing a ransomware attack. In block 1410, ransomware is detected. For example deep packet inspection may be used to inspect a copy of network packets, although more generally other techniques could be used. In block 1415, the primary DHCP server is quiesced. That is, it may be instructed to enter a quiescent state. In block 1420, the DHCP server functionality of the security appliance is activated to service IP address requests from endpoint devices of the VLAN domain. In block 1425, the security appliance overwrites the subnet mask of endpoint devices to 255.255.255.255 to set the security appliance as the default gateway. In block 1430, the security appliance is used to protect against lateral movement of ransomware, using techniques similar to those described earlier in previous examples.

DHCP Relay Implementation

Referring back to the example of FIG. 8, the security appliance 150 may be used in an architecture in which the firewall has a primary DHCP function and the DHCP server acts a DHCP relay. As an example, the security appliance 150 may detect the presence of malicious activity from any of the endpoints within the shared network indicative of ransomware. Alternatively, a third party solution could detect signs of ransomware and alert the security appliance. In response to detecting ransomware, it then acts as in the example of FIG. 8. The security appliance will overwrite the subnet mask to become the default gateway.

That is, the example of FIG. 8 may be adapted to support activating the security appliance as the default gateway only after signs of ransomware are detected. This provides another implementation option, such as for the case that a customer has a DHCP solution that they prefer to use during normal operation of the VLAN network.

Integration with Third Party NDR/SIEM

As previously discussed in regards to FIG. 12, in some implementations the security appliance 150 monitors a copy of network traffic, inspects the network traffic, and the security appliance is dynamically inserted to become the default gateway in response to detection of malicious network traffic indicative of ransomware.

However, in some implementations, the security appliance 150 may be integrated with other components that generate alerts in response to detecting malicious or suspicious network traffic. These alerts many be monitored by the security appliance. For example, the alerts of other components may be used to augment the detection capability of the security appliance. For example, different third party components may use different techniques to identify malicious or suspicious behavior that may complement the detection techniques used by the security appliance.

However, in some alternate embodiments, the alerts of other components may be used as the primary means of detecting malicious or suspicious network traffic for the security appliance. This may, for example, be provided as an option for customers that have networks with third party components for detecting malicious or suspicious behavior associated with ransomware.

As a few examples, the methodology of dynamically inserting the security appliance to provide protection from ransomware can be integrated with well-known third-party security solutions. Security information and event management (STEM) software collects log and event data generated by an organization's applications, security devices, and host systems and brings it together into a centralized platform. STEM gathers data from antivirus events, firewall logs and other sources and then sorts this data into categories to aid in identifying threats. Network Detection and Response (NDR) monitors network traffic for malicious actors and suspicious behaviors. In some implementations, the security appliance is integrated with NDR/SIEM solutions. In this implementation, whenever a third-party Network Detection and Response (NDR)/SIEM solution detects the presence of malicious network activity, this information is used by the security appliance to determine when it is to dynamically insert itself inline into the network and enforce zero trust isolation.

Detecting Attempts to Circumvent the Security Appliance

The security appliance 150 (when operated inline as the default gateway) is also able to detect attempts to circumvent the protection provided by the security appliance as discussed earlier in regard to other examples with the security appliance 150 continuously operating. When a network security threat is detected, the security appliance will insert itself in-line as a DHCP server and act as default gateway for endpoints on the shared network.

As discussed earlier, the security appliance 150 is able to quarantine compromised endpoints. If a compromised endpoint which has been quarantined by the isolation of security appliance attempts to bypass the security appliance by modifying its network mask locally and tries to laterally propagate to another device, this attempt would be detected by the security appliance and appropriate action would be taken. This detection is possible because the uncompromised endpoint would still send the response packets to the compromised endpoint via the security appliance (due to the /32 default route). The security appliance detects the fact that it has seen a response packet to a request sent by the compromised endpoint, and it alerts the operator in this case.

Alerts

In some implementations, the security appliance 150 may also trigger an alert to notify an IT manager/operator that it has detected the presence of malicious activity. For example, suppose the security appliance 150 performs deep packet inspection. In response to detecting ransomware message traffic, it quiesces the primary DHCP server and activates the DHCP functionality of the security appliance 150. However, there may be several hours before the endpoint devices reach the end of a DHCP lease renewal interval. During this time interval, the security appliance 150 may send an alert to an operator that it has detected ransomware. This may be a simple yes/no alert about the detection of ransomware message traffic. However, more generally it could include optional details about the factors used to identify ransomware and statistics regarding any changes to the message traffic in the time interval between initial detection and the security appliance becoming the default gateway.

Reset to Normal Mode of Operation

After a ransomware attack is contained and eliminated, the operation of the VLAN network may returned to its normal mode of operation. The primary DHCP server is reactivated and the security appliance 150 has its DHCP server capability placed in an inactive mode.

Alternate Embodiments

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:
    using a Dynamic Host Configuration Protocol (DHCP) server associated with a firewall or a router/switch in a shared VLAN environment having a plurality of endpoint devices;
    detecting ransomware in a shared VLAN environment;
    utilizing a DHCP server functionality of a security appliance to assign, by the security appliance, a subnet mask of 255.255.255.255 in response to DHCP IP address requests from the plurality of endpoint devices to set the security appliance as a default gateway for the plurality of endpoint devices of the shared VLAN environment;
    monitoring, by the security appliance, intra-VLAN communication between the plurality of endpoint devices of the shared VLAN environment; and
    blocking, by the security appliance, lateral propagation of ransomware between endpoint devices via intra-VLAN communication in the shared VLAN environment.

2. The computer-implemented method of claim 1, wherein detecting ransomware in the shared VLAN environment comprises deploying the security appliance in a tap or span port, monitoring a copy of network traffic, and detecting ransomware in the copy of the network traffic.

3. The computer implemented method of claim 2 further comprising quiescing the DHCP server subsequent to the detecting of ransomware in the shared VLAN environment.

4. The computer implemented method of claim 1, wherein the security appliance inserts itself as a DHCP relay in response to the detecting of ransomware.

5. The computer-implemented method of claim 1, wherein the blocking comprises blocking intra-VLAN communication of the compromised endpoint device.

6. The computer-implemented method of claim 1, wherein the monitoring comprises detecting a message attribute of a message originating from an endpoint device indicative of ransomware.

7. The computer-implemented method of claim 6, wherein the message attribute comprises file scanning code or file encryption code.

8. The computer-implemented method of claim 1, wherein the monitoring comprises detecting an attribute of message traffic, relative to a baseline profile of message traffic, indicative of an attempt to laterally propagate ransomware.

9. The computer-implemented method of claim 1, wherein the monitoring comprises: monitoring a response message from a first endpoint device to a second endpoint device not having a corresponding request message from the second endpoint device pass through the security appliance.

10. A computer-implemented method of ransomware protection in a Virtual Local Area Network (VLAN), comprising:

monitoring, a copy of intra-VLAN message traffic in a shared VLAN environment having a plurality of endpoint device appliances;

in response to an initial detection of ransomware in the copy of the message traffic, quiescing a primary Dynamic Host Configuration Protocol (DHCP) server associated with the shared VLAN environment and deploying a substitute DHCP server functionality associated with a security appliance;

assigning, by the security appliance, a subnet mask of 255.255.255.255 to each endpoint device to set the security appliance as a default gateway for the plurality of endpoint devices of the shared VLAN environment;

detecting, by the security appliance, attributes of intra-LAN messages indicative of attempted lateral propagation of ransomware from endpoint devices assigned the 255.255.255.255 subnet mask; and quarantining an endpoint device compromised by ransomware by blocking attempted intra-VLAN communication of the compromised endpoint device.

11. The computer-implemented method of claim 10, wherein the detecting comprises detecting message attributes associated with file scanning code or file encryption code.

12. The computer-implemented method of claim 10, wherein the detecting comprises detecting an attribute of message traffic, relative to a baseline profile of message traffic, indicative of an attempt to laterally propagate ransomware.

13. The computer-implemented method of claim 10 wherein the detecting comprises: detecting a response message from a first endpoint device to a second endpoint device not having a corresponding request message from the second endpoint device pass through the security appliance.

14. The computer implemented method of claim 10 wherein the initial detection of ransomware comprises: inspecting, by the security appliance, a copy of the message traffic of the shared VLAN environment and performing deep packet inspection (DPI).

15. The computer implemented method of claim 10, wherein the security appliance is communicatively coupled to a tap port or a span port of a router/switch of the shared VLAN network environment and the security appliance.

16. The computer implemented method of claim 10, where a DHCP lease interval of the plurality of endpoint devices is set to be less than 24 hours.

17. An apparatus to provide ransomware protection in a Virtual Local Area Network (VLAN), comprising:

a security appliance having a Dynamic Host Configuration Protocol (DHCP) server functionality, the security appliance having a first mode of operation in which the DHCP server functionality is inactive and a second mode of operation in which the DHCP server functionality is active, the security appliance being further configured to:

transition from the first mode of operation to the second mode of operation in response to an initial detection of ransomware in a shared VLAN network environment;

respond to DHCP requests of endpoint devices by overwriting the subnet mask 255.255.255.255 to set the security appliance as a default gateway for a plurality of endpoint devices of a shared VLAN environment:

monitor, by the security appliance, intra-VLAN communication between the plurality of endpoint devices of the shared VLAN environment; and detect, by the security appliance, lateral propagation of ransomware between endpoint devices via intra-VLAN communication in the shared VLAN environment; and block lateral propagation of ransomware among endpoint devices.

18. The apparatus of claim 17, wherein the security appliance is configured to quarantine an endpoint device compromised by ransomware by blocking intra-VLAN communication of the compromised endpoint device.

19. The apparatus of claim 17, wherein the security appliance instructs a DHCP server of the shared VLAN network to enter a quiescent state in response to the initial detection of ransomware in a shared VLAN network environment.

20. The apparatus of claim 17, further comprising a process and a memory, wherein the security appliance is implemented as computer program instructions stored on the memory and executable on the processor.

21. The apparatus of claim 20, wherein the security appliance is deployed on a tap or span port of a network router/switch and the security appliance, in the first mode, inspects copies of message traffic in the shared VLAN environment and performs the initial detection of ransomware.

22. The apparatus of claim 20, wherein the security appliance is deployed as a DHCP relay and in the first mode acts as a DHCP relay and in the second mode acts as the DHCP server for the shared VLAN network.

23. The apparatus of claim 20, wherein the security appliance responds to an IP address request of an endpoint device by relaying the request to the original DHCP function and overwriting the DHCP response with the subnet mask of 255.255.255.255 and setting itself as the default gateway for the endpoint device.

24. A computer-implemented method of ransomware protection in a Virtual Local Area Network (VLAN), comprising:

in a first mode of operation, using a Dynamic Host Configuration Protocol (DHCP) server in a shared VLAN environment having a plurality of endpoint devices;

detecting ransomware in a shared VLAN environment;

inserting a security appliance as a DHCP relay in response to the detecting of ransomware, including using a DHCP server functionality of the security appliance to assign, by the security appliance, a subnet mask of 255.255.255.255 in response to DHCP IP address requests from endpoint devices to set the security appliance as a default gateway for the plurality of endpoint devices of the shared VLAN environment;

monitoring, by the security appliance, intra-VLAN communication between the plurality of endpoint devices of the shared VLAN environment; and blocking, by the security appliance, lateral propagation of ransomware between endpoint devices via intra-VLAN communication in the shared VLAN environment.

* * * * *